(12) United States Patent
Liu et al.

(10) Patent No.: US 12,249,142 B2
(45) Date of Patent: Mar. 11, 2025

(54) METHOD AND AN ELECTRONIC APPARATUS FOR ACQUIRING A FLOOR MAP OF A ROOM LAYOUT

(71) Applicant: SAMSUNG ELECTRONICS CO., LTD., Suwon-si (KR)

(72) Inventors: Juan Liu, Nanjing (CN); Huasin Wang, Nanjing (CN); Sukun Yoon, Suwon-si (KR); Longhai Wu, Nanjing (CN); Jie Chen, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/748,378

(22) Filed: May 19, 2022

(65) Prior Publication Data
US 2022/0383635 A1 Dec. 1, 2022

Related U.S. Application Data

(63) Continuation of application No. PCT/KR2022/005776, filed on Apr. 22, 2022.

(30) Foreign Application Priority Data

May 25, 2021 (CN) .......................... 202110573320.6

(51) Int. Cl.
*G06V 20/00* (2022.01)
*G06T 7/50* (2017.01)
*G06V 20/64* (2022.01)

(52) U.S. Cl.
CPC ................ *G06V 20/36* (2022.01); *G06T 7/50* (2017.01); *G06V 20/64* (2022.01)

(58) Field of Classification Search
CPC ...... G06V 20/36; G06V 20/64; G06V 20/647; G06T 7/50
See application file for complete search history.

(56) References Cited

U.S. PATENT DOCUMENTS

| 5,398,195 A | 3/1995 | Kim |
| 8,705,893 B1 | 4/2014 | Zhang et al. |

(Continued)

FOREIGN PATENT DOCUMENTS

| CN | 107169595 A | 9/2017 |
| CN | 107480333 A | 12/2017 |

(Continued)

OTHER PUBLICATIONS

Pintore, G., Ganovelli, F., Villanueva, A.J. and Gobbetti, E., Oct. 2019. Automatic modeling of cluttered multi-room floor plans from panoramic images. In Computer Graphics Forum (vol. 38, No. 7, pp. 347-358).*

(Continued)

*Primary Examiner* — Zhitong Chen
(74) *Attorney, Agent, or Firm* — Sughrue Mion, PLLC

(57) ABSTRACT

A method and an electronic apparatus for acquiring a floor map of a room layout are provided. The method includes acquiring a depth map and a two-dimensional (2D) image of an interior of a room; identifying a boundary line between a ceiling and a wall of the room in the acquired 2D image; determining valid pixels among pixels on the boundary line according to a first preset rule; identifying an electronic device in the room and determining a location of the electronic device; acquiring the floor map of the room layout by projecting three-dimensional (3D) coordinates of actual points corresponding to the valid pixels and 3D coordinates of the determined location of the electronic device onto a horizontal plane, wherein, the floor map of the room layout comprises connection lines between projections of the 3D coordinates of the actual points corresponding to the valid pixels and an icon indicating a type and the location of the electronic device, and wherein, the 3D coordinates of the (Continued)

actual points corresponding to the valid pixels are determined based on the depth map and the 2D image.

18 Claims, 6 Drawing Sheets

(56) References Cited

U.S. PATENT DOCUMENTS

| | | | |
|---|---|---|---|
| 9,554,064 | B2 | 1/2017 | Dixon et al. |
| 9,942,724 | B2 | 4/2018 | Otis et al. |
| 10,572,970 | B2 | 2/2020 | Sturm et al. |
| 10,657,376 | B2 | 5/2020 | Lee et al. |
| 10,747,232 | B2 | 8/2020 | Xia et al. |
| 2016/0364871 | A1 | 12/2016 | Dixon et al. |
| 2018/0069932 | A1* | 3/2018 | Tiwari ............. G08B 29/18 |
| 2018/0315162 | A1* | 11/2018 | Sturm ............. H04N 13/239 |
| 2019/0035099 | A1* | 1/2019 | Ebrahimi Afrouzi ... G06T 7/344 |
| 2020/0234051 | A1* | 7/2020 | Lee ............. G06F 18/214 |
| 2021/0064216 | A1* | 3/2021 | Li ............. G06T 11/00 |
| 2021/0142497 | A1 | 5/2021 | Pugh et al. |
| 2022/0244740 | A1 | 8/2022 | Jiang et al. |

FOREIGN PATENT DOCUMENTS

| | | |
|---|---|---|
| CN | 111008654 A | 4/2020 |
| CN | 111984171 A | 11/2020 |
| CN | 112037279 A | 12/2020 |
| CN | 112785643 A | 5/2021 |
| JP | 2011-254128 A | 12/2011 |
| KR | 10-2016-0117143 A | 10/2016 |
| KR | 10-2019-0012599 A | 2/2019 |
| WO | 2016/154321 A1 | 9/2016 |

OTHER PUBLICATIONS

Hu, G., Huang, S., Zhao, L., Alempijevic, A. and Dissanayake, G., Oct. 2012. A robust rgb-d slam algorithm. In 2012 IEEE/RSJ International Conference on Intelligent Robots and Systems (pp. 1714-1719). IEEE.*

Bulten, W., Van Rossum, A.C. and Haselager, W.F., Apr. 2016. Human SLAM, indoor localisation of devices and users. In 2016 IEEE First International Conference on Internet-of-Things Design and Implementation (IoTDI) (pp. 211-222). IEEE (Bulten).*

Communication issued Jun. 21, 2022 by the Chinese Patent Office for Chinese Patent Application No. 202110573320.6.

Search Report (PCT/ISA/220, PCT/ISA/210) issued Jul. 26, 2022 by the International Searching Authority for International Application No. PCT/KR2022/005776.

Written Opinion (PCT/ISA/237) issued Jul. 26, 2022 by the International Searching Authority for International Application No. PCT/KR2022/005776.

Communication issued Jul. 17, 2024 by the European Patent Office in European Patent Application No. 22811493.0.

Abdelaal, Mohamed et al., "MapSense: Grammar-supported Inference of Indoor Objects from Crowd-sourced 3D point Clouds", ACM Transactions on Internet of Things, vol. 1, No. 2, Article 11, Apr. 2020, pp. 11:1-11:28. (28 pages total).

Pintore, Giovanni et al., "State-of-the-art in Automatic 3D Reconstruction of Structured Indoor Environments", Eurographics 2020, Computer Graphics Forum, vol. 39, No. 2, Apr. 9, 2020, pp. 667-699. (33 pages total).

* cited by examiner

FIG. 2
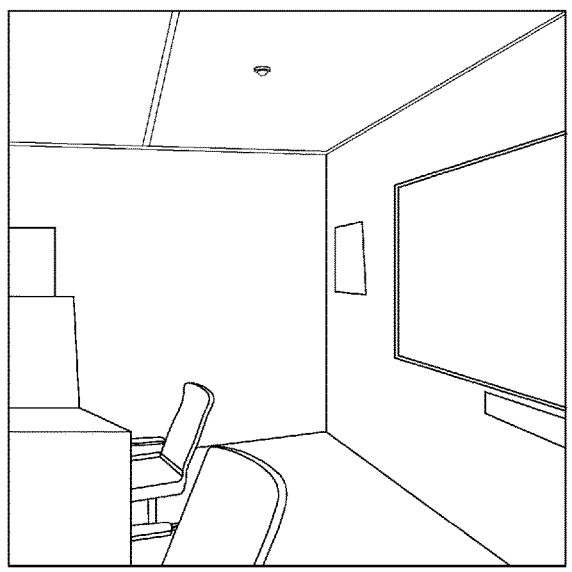 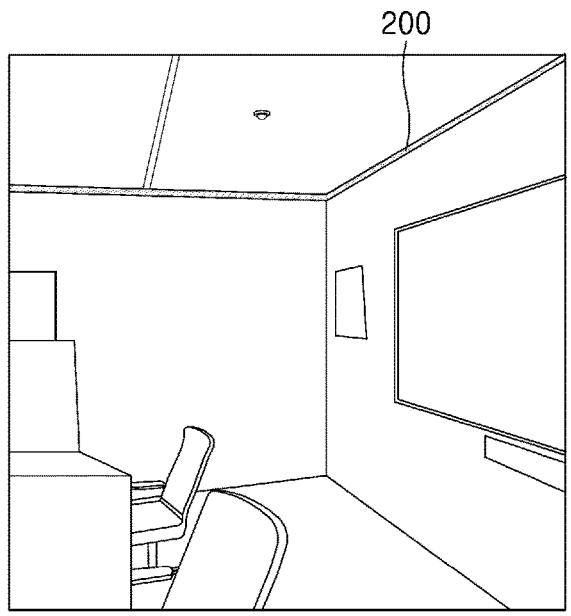
(a) (b)

METHOD AND AN ELECTRONIC APPARATUS FOR ACQUIRING A FLOOR MAP OF A ROOM LAYOUT

CROSS-REFERENCE TO RELATED APPLICATIONS

This application is a continuation of International Application No. PCT/KR2022/005776 designating the United States, filed on Apr. 22, 2022, in the Korean Intellectual Property Receiving Office and claiming priority to Chinese Patent Application No. 202110573320.6, filed on May 25, 2021 in the Chinese Patent Office, the disclosures of all of which are incorporated by reference herein in their entireties.

BACKGROUND

Field

The present disclosure relates to a field of data processing technology, and more specifically, to a method and an electronic apparatus for acquiring a floor map of a room layout.

Description of Related Art

As more and more Internet of Thing (IoT) devices are used in daily lives of people, how to conveniently manage these IoT devices becomes more important. At present, most of the existing indoor positioning technologies determine the position of the IoT devices relative to a terminal based on strengths of signals (Wi-Fi signals and/or Bluetooth signals) of the IoT devices received by the terminal. For example, the Digital Butler application in Samsung TV allows users to visually manage the IoT devices (for example, air conditioners, refrigerators, washing machines, etc.) in the room via the TV, but these IoT devices are displayed on the TV screen in concentric circles. For example, referring to the Samsung Digital Butler application interface shown in FIG. 5, when devices of the same type appear in multiple rooms, since the relative positions of the IoT devices displayed on the TV may be quite different from the real relative positions of the IoT devices in the room, the user may not be able to accurately distinguish the IoT devices in each room, which may result in inaccurate display or confusion to users.

SUMMARY

Additional aspects will be set forth in part in the description which follows, and in part, will be apparent from the description, or may be learned by practice of the presented embodiments.

The present disclosure is to provide a method and an electronic apparatus for acquiring a floor map of a room layout to accurately depict the floor map, so that the real relative positions of the IoT devices in the room are accurately reflected in the floor map and the user can conveniently control the IoT devices, thereby improving the user's operating experience.

According to an embodiment, there is provided a method for acquiring a floor map of a room layout. The method includes: acquiring a depth map and a two-dimensional (2D) image of an interior of a room; identifying a boundary line between a ceiling and a wall of the room in the acquired 2D image; determining valid pixels among pixels on the boundary line according to a first preset rule; identifying an electronic device in the room and determining a location of the electronic device; acquiring the floor map of the room layout by projecting three-dimensional (3D) coordinates of actual points corresponding to the valid pixels and 3D coordinates of the determined location of the electronic device onto a horizontal plane, wherein, the floor map of the room layout comprises connection lines between projections of the 3D coordinates of the actual points corresponding to the valid pixels and an icon indicating a type and the location of the electronic device, and wherein, the 3D coordinates of the actual points corresponding to the valid pixels are determined based on the depth map and the 2D image.

The determining the valid pixels among the pixels on the boundary line according to the first preset rule comprises: determining 3D coordinate of the actual point corresponding to each pixel on the boundary line and 3D coordinates of actual points corresponding to pixels near the boundary line based on the depth map, wherein the pixels near the boundary line are included in the 2D image and within a preset distance from the boundary line; determining two adjacent points within a predetermined distance range from the actual point corresponding to the each pixel on the boundary line according to a second preset rule, and determining a direction of a plane formed by the actual point corresponding to the each pixel and the determined two adjacent points, wherein the two adjacent points are included in the actual points corresponding to the pixels near the boundary line; sequentially determining a difference between directions of planes respectively corresponding to any two adjacent pixels on the boundary line; based on the difference being less than or equal to a first threshold value, determining that the two adjacent pixels on the boundary line are valid pixels; based on the difference being greater than the first threshold value, determining that the two adjacent pixels on the boundary line are invalid pixels, wherein, when a previous pixel of a current pixel is determined to be an invalid pixel, a pixel closest to the current pixel among the valid pixels that are previously determined is determined to be a pixel adjacent to the current pixel.

The identifying the electronic device in the room and determining the location of the electronic device comprises: determining whether electronic devices that have been identified include an electronic device of the same type as a currently identified electronic device; based on the electronic devices that have been identified including the electronic device of the same type as the currently identified electronic device, determining whether a distance between the currently identified electronic device and the electronic device of the same type is greater than or equal to a second threshold; based on determining that the distance is greater than or equal to the second threshold, determining that the currently identified electronic device is a new electronic device; based on determining that the distance is less than the second threshold, determining that the currently identified electronic device and the electronic device of the same type are the same electronic device.

The identifying the electronic device in the room and determining the location of the electronic device further comprises: based on determining that the currently identified electronic device and the electronic device of the same type are the same electronic device, determining newly determined coordinate of the currently identified electronic device to be coordinate of the electronic device of the same type.

The method further includes: identifying a furniture in the room and a location of the furniture, and acquiring the location of the furniture in the floor map of the room layout by projecting 3D coordinates of the location of the furniture onto the horizontal plane, wherein the floor map of the room layout comprises an icon representing a type and the location of the furniture.

The method further includes: displaying the floor map of the room layout on an electronic terminal; and establishing communication between the electronic terminal and the electronic device, wherein the icon corresponding to the electronic device is included in the floor map and is used to control the electronic device.

The above method, wherein the boundary line between the ceiling and the wall of the room is identified using a neural network model that is trained based on sample images including sample boundary lines.

The acquiring the depth map and the 2D image of the interior of the room comprises: acquiring only the depth map and the 2D image of a boundary area between the ceiling and the wall of the room, without acquiring a panoramic 2D image and depth map of the interior of the room.

The above method, wherein the location of the electronic device is identified based on the SLAM positioning technology.

The determining of the valid pixels among the pixels on the boundary line according to a first preset rule comprises converting 2D coordinates of actual points in the 2D image to 3D coordinates corresponding to the 2D coordinates.

According to an embodiment, there is provided an electronic apparatus for acquiring a depth map and a two-dimensional (2D) image of an interior of a room; identifying a boundary line between a ceiling and a wall of the room in the acquired 2D image; determining valid pixels among pixels on the boundary line according to a first preset rule; identifying an electronic device in the room and determine a location of the electronic device; acquiring the floor map of the room layout by projecting three-dimensional (3D) coordinates of actual points corresponding to the valid pixels and 3D coordinate of the determined location of the electronic device onto a horizontal plane, wherein, the floor map of the room layout comprises connection lines between projections of the 3D coordinates of the actual points corresponding to the valid pixels and an icon indicating a type and the location of the electronic device, and wherein, the 3D coordinates of the actual points corresponding to the valid pixels are determined based on the depth map and the 2D image.

The above electronic apparatus, wherein the boundary line between the ceiling and the wall of the room is identified using a neural network model stored in the memory that is trained based on sample images including sample boundary lines.

The above electronic apparatus, wherein the processor is further configured to acquire only the depth map and the 2D image of a boundary area between the ceiling and the wall of the room, without acquiring a panoramic 2D image and depth map of the interior of the room.

The above electronic apparatus, wherein the location of the electronic device is identified based on the SLAM positioning technology.

A non-transitory computer-readable storage medium storing a computer program, when executed by a processor, causing the processor to implement the method of acquiring the floor map of the room layout described above.

The boundary line between the ceiling and the wall of the room is identified using a neural network model that is trained based on sample images including sample boundary lines.

The acquiring the depth map and the 2D image of the interior of the room includes acquiring only the depth map and the 2D image of a boundary area between the ceiling and the wall of the room, without acquiring a panoramic 2D image and depth map of the interior of the room.

BRIEF DESCRIPTION OF THE DRAWINGS

The above and other aspects, features and advantages of the present disclosure will become more apparent from the following description taken in conjunction with the accompanying drawings, in which:

FIG. 2 is a schematic diagram illustrating an example of identifying a boundary line of a ceiling and a wall in an image;

DETAILED DESCRIPTION

Figure 1:
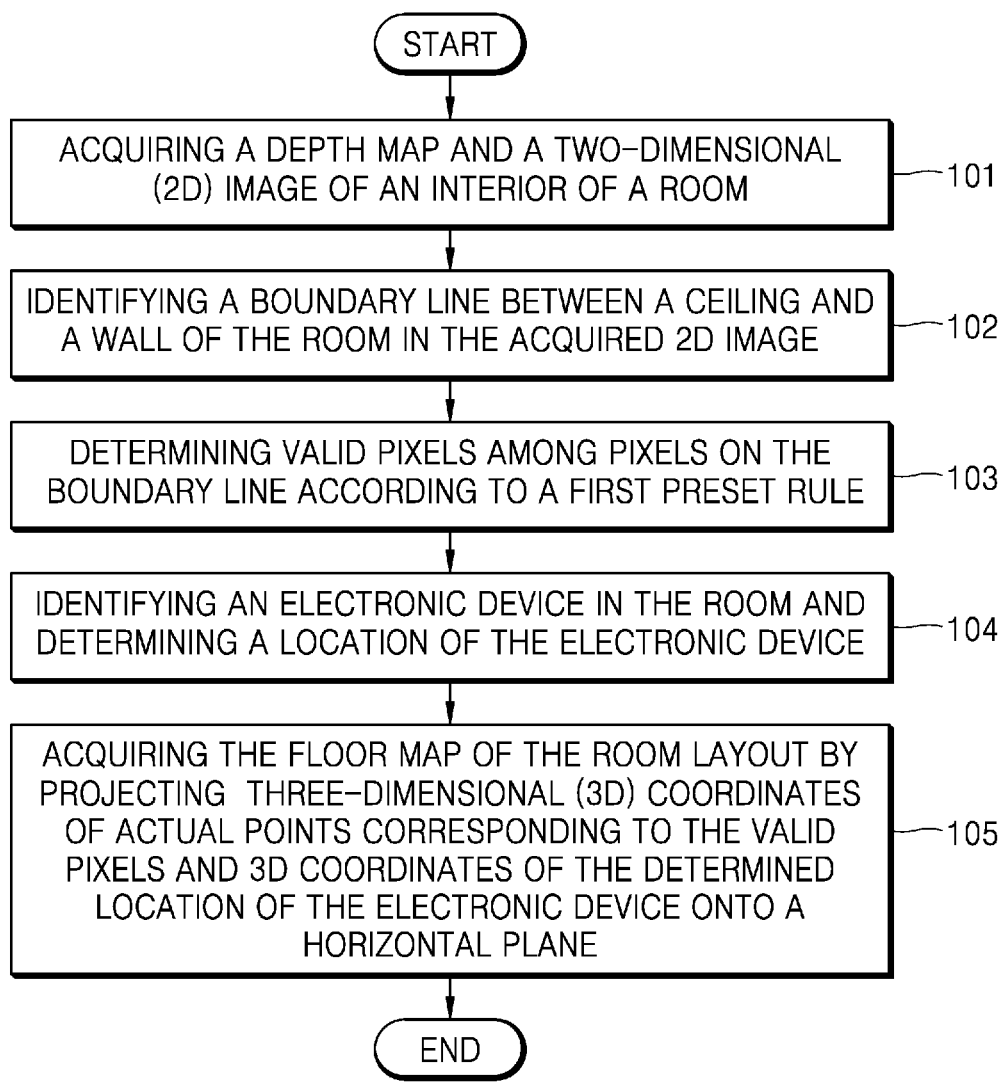
FIG. 1 is a flowchart illustrating a method of acquiring a floor map of a room layout according to an embodiment.

Hereinafter, various embodiments of the present disclosure are described with reference to the accompanying drawings, in which like reference numerals are used to depict the same or similar elements, features, and structures. However, the present disclosure is not intended to be limited by the various embodiments described herein to a specific embodiment and it should be understood that the present disclosure covers all modifications, equivalents, and/or alternatives of the embodiments of the present disclosure, provided they fall within the scope of the appended claims and their equivalents. The terms and words used in the following description and claims are not limited to their dictionary meanings, but, are used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly indicates otherwise. The terms "include," "comprise," and "have", used herein, indicate disclosed functions, operations, or the existence of elements, but does not exclude other functions, operations, or elements.

For example, the expressions "at least one of a, b or c" indicates only a, only b, only c, both a and b, both a and c, both b and c, or all of a, b and c.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

FIG. 1 is a flowchart illustrating a method of acquiring a floor map of a room layout according to an embodiment.

Referring to FIG. 1, at step S101, a depth map and a 2D image of an interior of a room are acquired.

As an example, the depth map and the 2D image of the interior of the room may be acquired through a camera or an electronic device including a camera. Through the acquired depth map and 2D image of the interior of the room, 3D coordinates of objects inside the room may be determined.

At step S102, a boundary line between a ceiling and a wall in the acquired 2D image is identified.

As an example, the boundary line between the ceiling and the wall in a 2D image may be identified by a trained neural network model. For example, the neural network model may accurately determine the boundary line between the ceiling and the wall in the image by training the neural network model with sample pictures including boundary lines between ceilings and walls. For example, the boundary line in the acquired 2D image may be determined by determining which pixels in the 2D image represent the boundary line between the ceiling and the wall.

As an example, only the depth map and 2D image of the boundary line between the ceiling and the wall and locations near the boundary line may be acquired. For example, the camera may be used to capture only the 2D image and depth map of boundary area between the ceiling and the wall, without acquiring panoramic 2D image and depth map of the interior of the room.

As an example, LSTM (Long Short-Term Memory) deep neural network model may accurately determine the boundary line between the ceiling and the wall in the image by training the neural network model with sample pictures including boundary lines between ceilings and walls. Using the boundary line for SLAM localization, the electronic apparatus for acquiring a floor map of a room layout may avoid both the big window issue and the low texture issue which are really difficult to handle using vision cues alone.

FIG. 2 is a schematic diagram illustrating an example of identifying the boundary line of the ceiling and the wall in the image.

Referring to FIG. 2(a), an electronic device may acquire 2D image of the interior of the room including boundary area between the ceiling and the wall. By inputting the acquired 2D image of the interior of the room into the trained neural network model, the boundary line 200 in the 2D image may be determined as shown in FIG. 2(b).

Referring back to FIG. 1, at step S103, valid pixels among a plurality of pixels on the boundary line are determined according to a first preset rule.

Since the boundary line is recognized based on the 2D image, actual points corresponding to pixels on the recognized boundary line may not be at the junction of the ceiling and the wall. Therefore, it is necessary to check pixel points on the recognized boundary line to determine pixels on the boundary line, the actual points corresponding to which are at the junction of the ceiling and the wall, and determine such pixels to be valid pixels.

Figure 3:
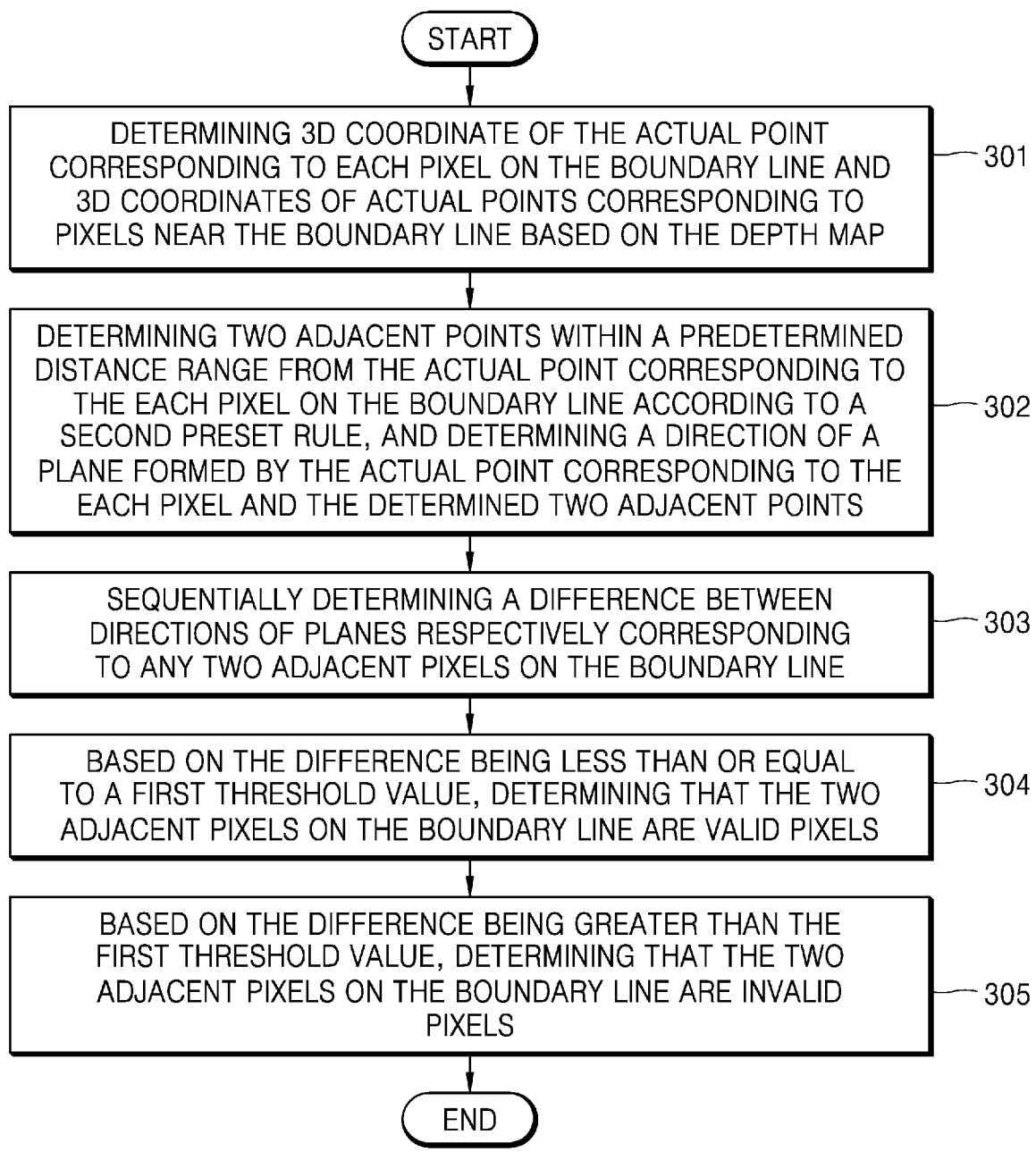
FIG. 3 is a flowchart illustrating a method of determining valid pixels among pixels on the boundary line according to a first preset rule according to an embodiment.

FIG. 3 is a flowchart illustrating a method of determining valid pixels among the pixels on the boundary line according to the first preset rule according to an embodiment. The step S103 of FIG. 1 will be described in more detail with reference to FIG. 3.

Referring to FIG. 3, at step S301, 3D coordinates of the actual point corresponding to each pixel on the boundary line and the 3D coordinates of the actual point corresponding to pixels near the boundary line are determined based on the depth map. Here, the pixels near the boundary line may be determined based on pixels within a preset distance from the boundary line. As described above, the 3D coordinates of the actual point corresponding to each pixel may be obtained through the depth map and the coordinates in the two-dimensional image of the each pixel. As an example, 2D to 3D conversion may be preceded the determining of the 3D coordinate of actual point. The determining of the valid pixels among the pixels on the boundary line according to a first preset rule comprises converting 2D coordinates of actual points in the 2D image to 3D coordinates corresponding to the 2D coordinates.

At step S302, two adjacent points within a predetermined distance range from the actual point corresponding to each pixel on the boundary line are determined according to a second preset rule, and a direction of a plane formed by the actual point corresponding to the each pixel and the two adjacent points are determined. Here, the two adjacent points may correspond to each actual point of the pixels near the boundary line. In other words, the boundary line may be formed by connecting each actual point representing each of the pixels. As an example, the second preset rule may randomly select two adjacent points within a predetermined distance range from the actual point corresponding to the each pixel. However, the second preset rule is not limited thereto. For example, two points in a predetermined direction within the predetermined distance range may be selected according to the second preset rule.

At step S303, a difference between directions of the planes respectively corresponding to any two adjacent pixels on the boundary line are sequentially determined.

For ease of description, a first pixel point, a second pixel point, a third pixel point, and a fourth pixel point arranged in order on the boundary line are taken as an example for description.

A first plane, a second plane, a third plane and a fourth plane respectively corresponding to the first pixel, the second pixel, the third pixel and the fourth pixel may be determined, and respective directions of the first plane, the second plane, the third plane and the fourth plane may be determined. For example, for the first pixel, 3D coordinate of the actual point corresponding to the first pixel is determined, and two adjacent points within a predetermined distance from the actual point corresponding to the first pixel are selected. A first plane may be formed by a first actual point corresponding to the first pixel and the selected two adjacent points corresponding to the first actual point, and a direction of the first plane may be determined by the coordinates of the actual point and the two adjacent points. The planes corresponding to other pixels and the directions of the planes corresponding to the other pixels may be determined in a similar manner.

At step S304, when the difference between directions of the planes is less than or equal to a first threshold value, it is determined that pixels on the boundary line are valid pixels. For example, if the difference between the first direction and the second direction is less than or equal to the first threshold value, the first pixel and the second pixel are determined as valid pixels. As another example, if the difference between the third direction and the second direction is less than or equal to the first threshold value, the second pixel and the third pixel are determined as valid pixels.

At step S305, when the difference between directions of the planes is greater than the first threshold value, it is determined that pixels on the boundary line are invalid pixels. For example, if the difference between the first direction and the second direction is greater than the first threshold value, the first pixel and the second pixel are determined to be invalid pixels. As another example, if the difference between the third direction and the second direction is greater than the first threshold value, the second pixel and the third pixel are determined as invalid pixels.

As an example, when a previous pixel of the current pixel is determined to be an invalid pixel, a pixel closest to the current pixel among valid pixels that are previously determined is determined to be a pixel adjacent to the current pixel.

For example, if the difference between the first direction and the second direction is less than or equal to the first threshold value, and the difference between the third direction and the second direction is greater than the first threshold value, only the third pixel is determined as an invalid pixel because the first pixel and the second pixel have been determined to be valid pixels.

For example, assuming that the fourth pixel is the current pixel, if the first pixel and the second pixel are determined to be valid pixels, and the third pixel is determined to be an invalid pixel, the second pixel is determined to be the pixel adjacent to the fourth pixel, and the difference between a fourth direction of the fourth plane corresponding to the fourth pixel and the second direction is compared to the first threshold value. If the difference between the fourth direction and the second direction is less than or equal to the first threshold value, the fourth pixel point is a valid pixel, and if not, the fourth pixel point is an invalid pixel.

According to the first preset rule described in this embodiment, all valid pixels on the identified boundary line may be determined. Those skilled in the art should understand that the first preset rule described in this embodiment is only an example, and the pixels on the boundary line may be checked based on any suitable rule.

Referring back to FIG. 1, at step S104, an electronic device in the room is identified and the location of the electronic device is determined.

As an example, the electronic device in the room may be identified through an electronic terminal and the location of the electronic device may be determined based on the SLAM positioning technology. As an example, the electronic device in the room may be recognized based on the trained object recognition neural network.

As an example, when the electronic device in the room is identified through the electronic terminal, the type of the identified electronic device (for example, TV, refrigerator, washing machine, etc.) may be displayed on the screen of the electronic terminal, and the user may determine whether the identification result is correct, modify the recognition result or add remarks to the identified electronic device through the screen.

As an example, in addition to identifying the electronic device in the room and determining the location of the electronic device, it is also possible to identify a furniture in the room and determine a location of the furniture. As an example, the electronic devices in the room include household appliances such as TV, a refrigerator, a vacuum cleaner, etc., and the furniture includes objects that may not have electronic functions, such as beds, sofas, and chairs.

At step S105, the floor map of the room layout is acquired by projecting the 3D coordinates of actual points corresponding to the valid pixels and the 3D coordinates of the determined location of the electronic device onto a horizontal plane. The floor map of the room layout may include connection lines between projections of 3D coordinates of the actual points corresponding to the valid pixels and an icon used to indicate a type and the location of the electronic device, and wherein the 3D coordinates of the actual points corresponding to the valid pixels are determined based on the depth map and the two-dimensional image. In other words, the floor map of the room layout is a top view of the 3D coordinates of the actual points corresponding to the valid pixel points and the 3D coordinates of the determined location of the electronic device.

As an example, the 3D coordinates of location of the furniture may also be projected onto the horizontal plane to obtain the location of the furniture in the floor map of the room layout, wherein the floor map of the room layout includes an icon for representing the type and the location of the furniture. In this way, since the floor map of the room layout also includes the icon of furniture, the acquired floor map of the room layout enables the user to visually recognize the relative positions of the electronic device and/or furniture in the room.

Those skilled in the art should understand that a coordinate system used to obtain the depth map and the 2D image of the internal of the room may be consistent with a coordinate system used to determine locations of the electronic devices and/or furniture in the room. When the two coordinate systems are different or inconsistent, one of the two coordinate systems can be converted to another so as to have a uniform coordinate system. Then, the floor map of the room layout is acquired based on the unified three-dimensional coordinates of the actual points. For example, the coordinates of actual points on the boundary line and the locations of the electronic device and/or furniture are transformed into coordinates in the global coordinate system.

As an example, it is determined whether electronic devices that have been identified include electronic devices of the same type. For example, in response to the electronic devices that have been identified including an electronic device that is the same type as a currently identified electronic device, it is determined whether the distance between the currently identified electronic device and the electronic device of the same type is greater than or equal to a second threshold. When the distance is greater than or equal to the second threshold, it is determined that the currently identified electronic device is a new electronic device. Moreover, when the distance is less than the second threshold, it is determined that the currently identified electronic device and the electronic device of the same type are the same electronic device.

As another example, when the electronic devices that have been identified do not include an electronic device of the same type as the currently identified electronic device, the currently identified electronic device may be determined as a new electronic device.

As another example, in response to determining that the currently identified electronic device and another electronic device are of the same type, a coordinate of the currently identified electronic device may be used as a coordinate of the another electronic device so as to maintain the uniform coordinate system among the electronic devices of the same type. That is, the newly determined coordinate of the same electronic device are used as the coordinates of the electronic device.

The above examples provide how to distinguish whether the currently identified electronic device is a new electronic device or an electronic device that has been identified before. For furniture identification, it can be determined in a similar manner whether the currently identified furniture is a new furniture or furniture that has been identified before.

According to an embodiment, the floor map of the room layout determined by the method described above may be displayed on the electronic terminal. For example, the electronic terminal may communicate with one or more electronic devices, and icons corresponding to the electronic devices may be displayed on a display screen of the electronic terminal and used to control the electronic devices. The icons may indicate locations and types of the electronic devices on the floor map of the room layout, and based on a user input on the icons or any user interface provided in the floor map, the electronic terminal may transmit a control signal to a selected electronic device among a plurality of electronic devices to control the selected electronic device to perform operations according to the user input. As an example, a new apparatus (for example, a household appliance and/or furniture) may be added to the acquired floor map of the room layout. For example, a type and a location of a new device is determined, and an icon representing the type and location of the new device is displayed in the floor map of the room layout based on the coordinates of the location of the new device. As an example, the icon corresponding to the electronic device and/or furniture may also be deleted from the floor map of the room layout.

As an example, a mobile terminal (for example, a mobile phone) may be used to capture one or more images of the boundary line of each wall in the room and the electronic devices and/or furniture in the room.

A floor map of the room layout generated based on the captured images is displayed on the mobile terminal. The floor map of the room layout may be generated by a mobile phone or by sending images captured by the mobile terminal to a server, and the server generates the floor map of the room layout based on the captured images and sends the floor map of the room layout to the mobile terminal. By establishing a communication between the mobile terminal and the electronic device, the mobile terminal may transmit user commands to control the electronic device through the icon representing the electronic device in the floor map of the room layout displayed on the mobile terminal.

Those skilled in the art should understand that the icon used to control the electronic device is associated with the electronic device, and the mobile terminal sends a control instruction to the electronic device in response to the user's operation for the icon, and the electronic device performs a corresponding operation according to the received control instruction.

As an example, the mobile terminal may send the floor map of the room layout to other devices (for example, a TV), the icon representing the electronic device in the floor map of the room layout is associated with the electronic device by establishing communication between the TV and the electronic device, and the electronic device is controlled through the TV. For example, if the user is watching TV and finds that the room is too dark and the air is dry, the user may turn on a chandelier and an air humidifier through an icon corresponding to the chandelier in the room and an icon corresponding to the air humidifier. Those skilled in the art should understand that the control for the electronic device through the icon is only an example, and the electronic device in the room may also be controlled in other ways (for example, by voice) via devices displaying the floor map of the room layout.

The one or more embodiments determine the floor map of the room layout based on the boundary line between the ceiling and the wall, and may be applicable to both rectangular and irregular apartment types (for example, concave and L-shaped apartment types).

The method for acquiring the floor map of the room layout according to an embodiment of the present disclosure is described above with reference to FIGS. 1 to 3, and an electronic device for acquiring the floor map of the room layout according to an embodiment of the present disclosure is described below with reference to FIG. 4.

Figure 4:
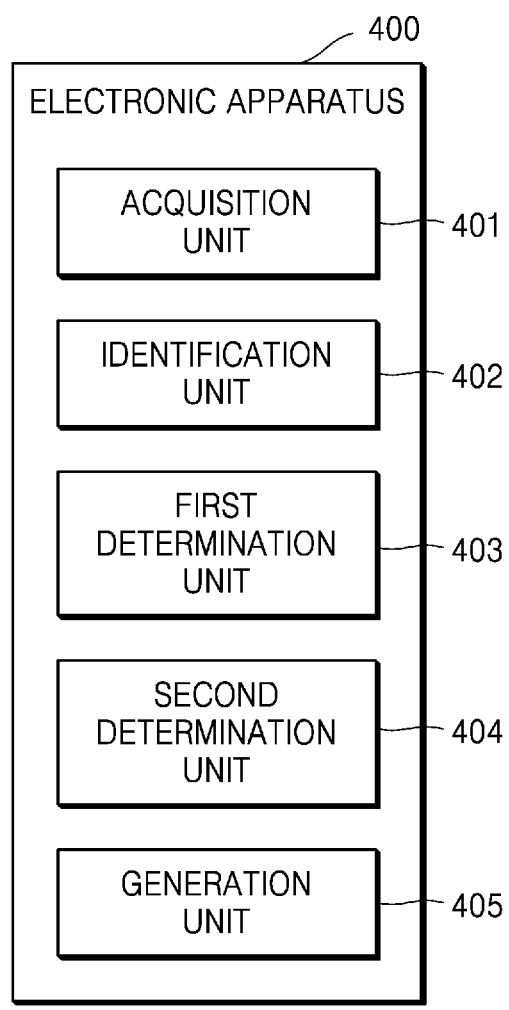
FIG. 4 is a block diagram of an electronic apparatus 400 for acquiring a floor map of a room layout according to an embodiment.
Figure 5:
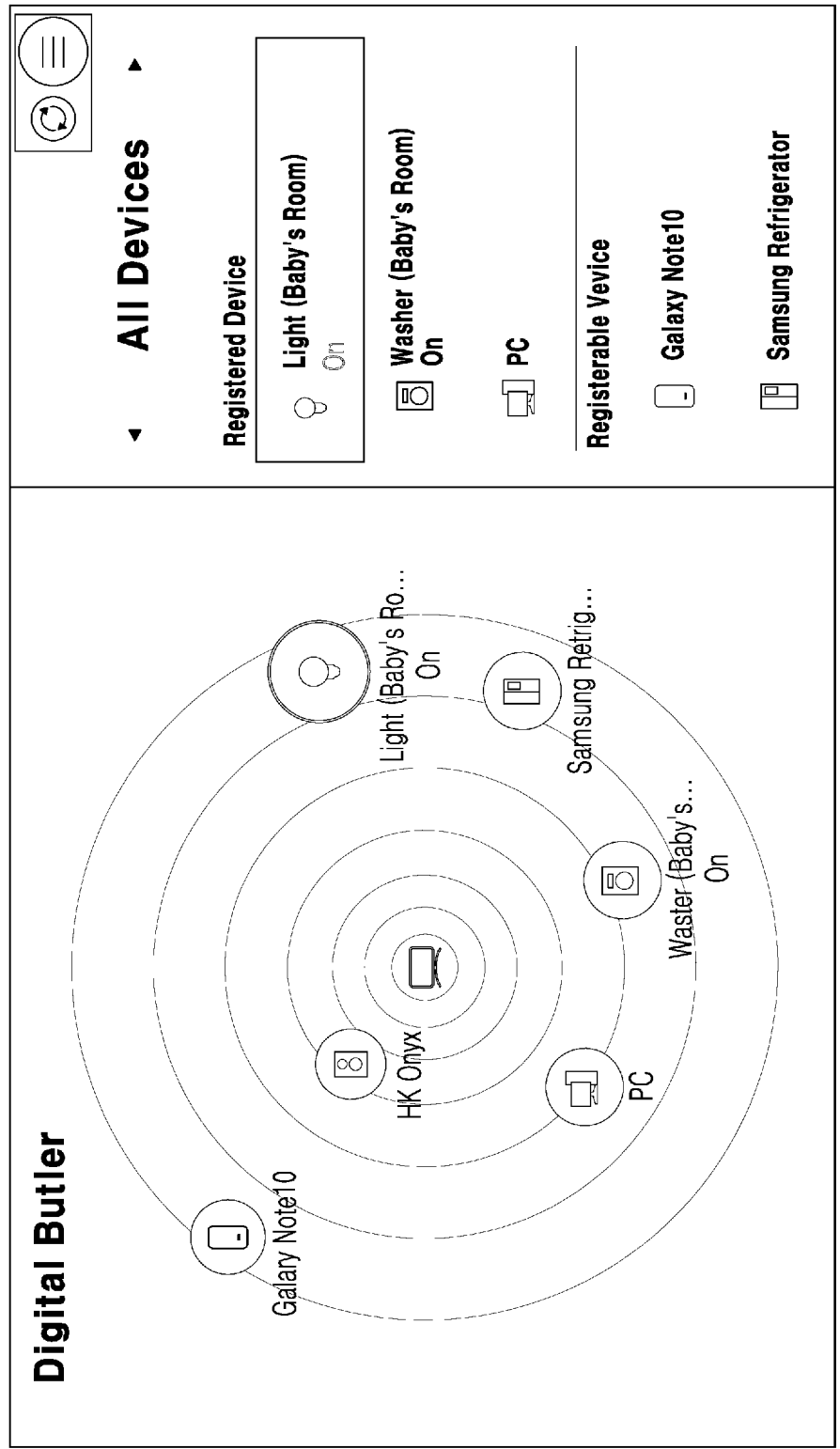
FIG. 5 is a diagram of an example of an interface for a Samsung Digital Butler application.

FIG. 4 shows a block diagram of an electronic apparatus 400 for acquiring a floor map of a room layout according to an embodiment.

Referring to FIG. 4, the electronic apparatus 400 may include an image acquisition unit 401, an identification unit 402, a first determination unit 403, a second determination unit 404, and a generation unit 405. Those skilled in the art should understand that the electronic apparatus 400 may additionally include other components, and a part of the components included in the electronic apparatus 400 may be combined or divided, and the same functions may be implemented before and after the combination or dividing.

As an example, the image acquisition unit 400 may be configured to acquire a depth map and a 2D image of interior of the room. The identification unit 402 may be configured to identify a boundary line between a ceiling and a wall in the acquired 2D image. The first determination unit 403 may be configured to determine valid pixels among a plurality of pixels on the boundary line according to a first preset rule. The second determination unit 404 may be configured to identify an electronic device in the room and determine a location of the electronic device. The second determination unit 404 may be further configured to identify furniture in the room and a location of the furniture.

The generation unit 405 may be configured to acquire the floor map of the room layout by projecting the 3D coordinates of the actual point corresponding to the valid pixels and the 3D coordinates of the identified location of the electronic device onto a horizontal plane, wherein the floor map of the room layout includes connection lines between projections of 3D coordinates of the actual points corresponding to the valid pixels and an icon used to indicate a type and the location of the electronic device, and wherein the 3D coordinates of the actual point corresponding to the valid pixels are determined based on the depth map and the two-dimensional image.

The generation unit 405 may further acquire a location of the furniture in the floor map of the room layout by projecting the 3D coordinates of the location of the furniture onto the horizontal plane, wherein the floor map of the room layout includes an icon that represents the type and the location of the furniture. As an example, the first determination unit 403 may be configured to determine 3D coordinate of actual point corresponding to each pixel on the boundary line and the 3D coordinates of adjacent points corresponding to pixels near the boundary line based on the depth map, wherein the pixels near the boundary line are included in the 2D image, and wherein the pixels near the boundary line are pixels within a preset distance from the boundary line. The first determination unit 403 may determine two adjacent points within a predetermined distance range from the actual point corresponding to the each pixel on the boundary line for the each pixel according to a second preset rule, and determine a direction of a plane formed by the actual point corresponding to the each pixel and the determined two adjacent points, wherein the two adjacent points correspond to the pixels near the boundary line. The first determination unit 403 may sequentially determine a difference between directions of the planes respectively corresponding to any two adjacent pixels on the boundary line, and determine that pixels on the boundary line corresponding to the difference value are valid pixels. When the difference is less than or equal to a first threshold value, the first determination unit 403 determines that pixels on the boundary line corresponding to the difference are an invalid pixels, and when the difference is greater than the first threshold, wherein when a nearest previous pixel of current pixel is determined to be an invalid pixel, a pixel closest to the current pixel among valid pixels that are previously determined is determined to be a pixel adjacent to the current pixel, and wherein pixels that have been determined to be valid pixels are not re-determined as invalid pixels.

As an example, the second determination unit 404 may be configured to determine whether electronic devices that have been identified include an electronic device of the same type as a currently identified electronic device. In response to the electronic devices that have been identified including the electronic device of the same type as the currently identified electronic device, the second determination unit 404 may determine whether the distance between the currently identified electronic device and the electronic device of the same type is greater than or equal to a second threshold. In response to determining that the distance is greater than or equal to the second threshold, the second determination unit 404 may determine that the currently identified electronic device is a new electronic device. In response to determining that the distance is less than the second threshold, the second determination unit 404 may determine that the currently identified electronic device and the electronic device of the same type are the same electronic device.

As an example, the second determination unit 404 is further configured to, in response to determining that the currently identified electronic device and the electronic device of the same type are the same electronic device, determine the newly determined coordinate of the same electronic device to be coordinate of the same electronic device.

According to an embodiment of the present disclosure, there is provided an electronic terminal for controlling an electronic device, the electronic terminal comprises: a display unit configured to display a floor map of a room layout determined by the method as described above, and a communication unit configured to establish a communication between the electronic terminal and the electronic device, wherein the icon corresponding to the electronic device is used to control the electronic device.

According to an embodiment of the present disclosure, there is provided a non-transitory computer-readable storage medium storing a computer program, when executed by a processor, causing the processor to implement the method for acquiring a floor map of a room layout as described above.

According to an embodiment of the present disclosure, there is provided an electronic apparatus, the electronic apparatus includes: a processor; a memory storing a computer program, when executed by the processor, causing the processor to implement the method for acquiring a floor map of a room layout as described above.

Figure 6:
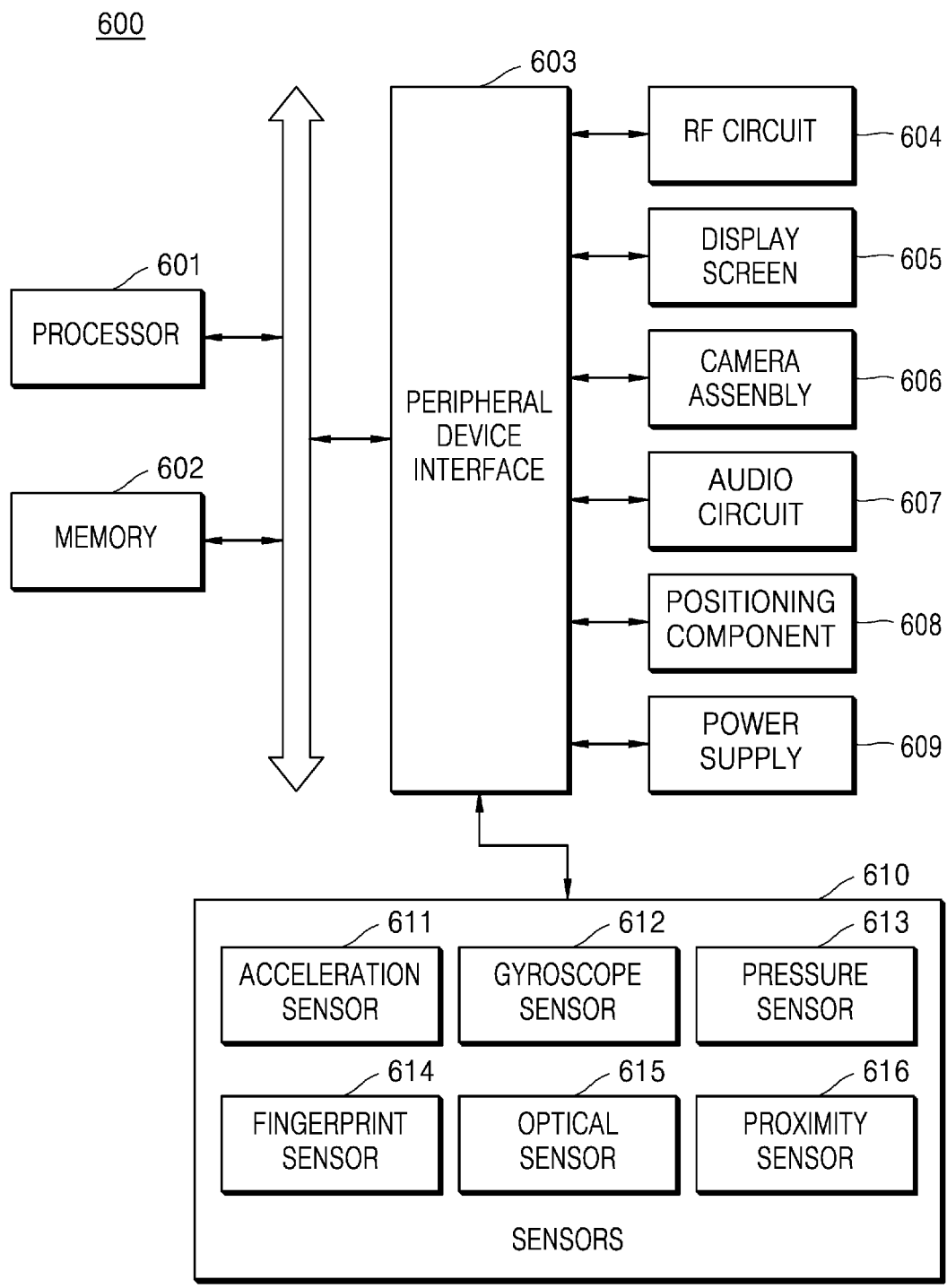
FIG. 6 is a structural block diagram illustrating an electronic apparatus for acquiring a floor map of a room layout according to an embodiment.

FIG. 6 is a structural block diagram illustrating an electronic apparatus for acquiring a floor map of a room layout according to an embodiment. The electronic apparatus 600 may be, for example, a smart phone, a tablet computer, an MP3 (Moving Picture Experts Group Audio Layer III) player, MP4 (Moving Picture Experts Group Audio Layer IV) Player, laptop or desktop computer. The electronic apparatus 600 may also be called user equipment, portable terminal, laptop terminal, desktop terminal and other names.

The electronic apparatus 600 includes a processor 601 and a memory 602.

The processor 601 may include one or more processing cores, such as a 4-cores processor, an 8-cores processor, and so on. The processor 1001 may be implemented in at least one hardware form of DSP (Digital Signal Processing), FPGA (Field Programmable Gate Array), PLA (Programmable Logic Array). The processor 601 may also include a main processor and a slave processor. The main processor is a processor used to process data in a awake state, also called a CPU (Central Processing Unit); the slave processor is a low-power processor used to process data in a standby state. In some embodiments, the processor 601 may be integrated with a GPU (Graphics Processing Unit) used to render and draw content that needs to be displayed on the display screen. In some embodiments, the processor 601 may further include an AI (Artificial Intelligence) processor used to process calculation operations related to machine learning.

The memory 602 may include one or more computer-readable storage media, which may be non-transitory. The memory 602 may also include a high-speed random access memory (RAM) and a non-volatile memory, such as one or more magnetic disk storage devices and flash memory storage devices. In some embodiments, the non-transitory computer-readable storage medium in the memory 602 is used to store at least one instruction used to be executed by the processor 601 to implement the method for acquiring the floor map of the room layout in the present disclosure.

In some embodiments, the electronic apparatus 600 may further include a peripheral device interface 603 and at least one peripheral device. The processor 601, the memory 602, and the peripheral device interface 603 may be connected by a bus or a signal line. Each peripheral device may be connected to the peripheral device interface 603 through a bus, a signal line, or a circuit board. Specifically, the peripheral devices include a radio frequency circuit 604, a touch screen 605, a camera 606, an audio circuit 607, a positioning component 608, and a power supply 609.

The peripheral device interface 603 may be used to connect at least one peripheral device related to I/O (Input/Output) to the processor 601 and the memory 602. In some embodiments, the processor 601, the memory 602, and the peripheral device interface 603 are integrated on the same chip or circuit board. In some other embodiments, any one or two of the processor 601, the memory 602, and the peripheral device interface 603 may be implemented on a separate chip or circuit board, which is not limited in this embodiment.

The radio frequency circuit 604 is used for receiving and transmitting RF (Radio Frequency) signals, also called electromagnetic signals. The radio frequency circuit 604 communicates with a communication network and other communication devices through electromagnetic signals. The radio frequency circuit 604 converts electrical signals into electromagnetic signals for transmission, or converts received electromagnetic signals into electrical signals. Alternatively, the radio frequency circuit 604 includes: an antenna system, an RF transceiver, one or more amplifiers, a tuner, an oscillator, a digital signal processor, a codec chipset, a user identity module card, and so on. The radio frequency circuit 604 can communicate with other terminals through at least one wireless communication protocol. The wireless communication protocol includes, but is not limited to metropolitan area networks, various generations of mobile communication networks (2G, 3G, 4G, and 5G), wireless local area networks and/or Wi-Fi (Wireless Fidelity) networks. In some embodiments, the radio frequency circuit 604 may also include a circuit related to NFC (Near Field Communication), which is not limited in the present disclosure.

The display screen 605 is used to display a UI (User Interface). The UI may include graphics, text, icons, videos, and any combination thereof. When the display screen 605 is a touch display screen, the display screen 605 also has an ability to collect touch signals on or above the surface of the display screen 605. The touch signal may be input to the processor 601 as a control signal for processing. At this time, the display screen 605 may also be used to provide virtual buttons and/or virtual keyboards, also called soft buttons and/or soft keyboards. In some embodiments, the display screen 605 may be one display screen, which is arranged on the front panel of the electronic apparatus 600. In other embodiments, the display screen 605 may be at least two display screens 605, which are respectively arranged on different surfaces of the terminal or in a folded design. In still other embodiments, the display screen 605 may be a flexible display screen, which is arranged on the curved surface or the folding surface of the electronic apparatus 600. Furthermore, the display screen 605 may also be set as a non-rectangular irregular shape, that is, a special-shaped screen. The display screen 605 may be made of materials such as LCD (Liquid Crystal Display), OLED (Organic Light-Emitting Diode).

The camera assembly 606 is used to capture images or videos. The camera assembly 606 includes a front camera and a rear camera. The front camera is disposed on the front panel of the terminal, and the rear camera is disposed on the back of the terminal. In some embodiments, the rear camera is at least two cameras, each of which is a main camera, a depth-of-field camera, a wide-angle camera, and a telephoto camera, so as to realize a fusion of the main camera and the depth-of-field camera to realize the background blur function, a fusion of the main camera and the wide-angle camera to realize panoramic shooting and VR (Virtual Reality) shooting function or other fusion shooting functions. In some embodiments, the camera assembly 606 may also include a flash. The flash may be a single-color temperature flash or a dual-color temperature flash. Dual color temperature flash refers to a combination of warm light flash and cold light flash, which may be used for light compensation under different color temperatures.

The audio circuit 607 may include a microphone and a speaker. The microphone is used to collect sound waves of the user and the environment, and convert the sound waves into electrical signals and input them to the processor 601 for processing, or input to the radio frequency circuit 604 to implement voice communication. For the purpose of stereo collection or noise reduction, there may be multiple microphones, which are respectively set in different parts of the electronic apparatus 600. The microphone may also be an array microphone or an omnidirectional collection microphone. The speaker is used to convert the electrical signal from the processor 601 or the radio frequency circuit 604 into sound waves. The speaker may be a traditional thin-film speaker or a piezoelectric ceramic speaker. When the speaker is a piezoelectric ceramic speaker, it may not only convert electrical signals into sound waves that are audible to humans, but also convert electrical signals into sound waves that are inaudible to humans for distance measurement and other purposes. In some embodiments, the audio circuit 607 may also include a headphone jack.

The positioning component 608 is used to locate a current geographic location of the electronic apparatus 600 to implement navigation or LBS (Location Based Service). The positioning component 608 may be a positioning component based on the GPS (Global Positioning System) of the United States, the Beidou system of China, the GLONASS system of Russia, or the Galileo system of the European Union.

The power supply 609 is used to supply power to various components in the electronic apparatus 600. The power supply 609 may be alternating current, direct current, disposable batteries, or rechargeable batteries. When the power supply 609 includes a rechargeable battery, the rechargeable battery may support wired charging or wireless charging. The rechargeable battery may also be used to support fast charging technology.

In some embodiments, the electronic apparatus 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect the magnitude of acceleration on the three coordinate axes of the coordinate system used by the terminal 600. For example, the acceleration sensor 611 may be used to detect the components of gravitational acceleration on three coordinate axes. The processor 601 may control the touch screen 605 to display the user interface in a horizontal view or a vertical view according to the gravity acceleration signal collected by the acceleration sensor 611. The acceleration sensor 611 may also be used for the collection of game or user motion data.

The gyroscope sensor 612 may detect the body direction and rotation angle of the electronic apparatus 600, and the gyroscope sensor 612 may cooperate with the acceleration sensor 611 to collect the user's 3D actions on the electronic apparatus 600. The processor 601 may implement the following functions according to the data collected by the gyroscope sensor 612: motion sensing (for example, changing the UI according to the user's tilt operation), image stabilization during shooting, game control, and inertial navigation.

The pressure sensor 613 may be disposed on a side frame of the electronic apparatus 600 and/or the lower layer of the touch screen 605. When the pressure sensor 613 is arranged on the side frame of the electronic apparatus 600, the user's holding signal for the terminal 600 may be detected, and the processor 601 performs left and right hand recognition or quick operation according to the holding signal collected by the pressure sensor 613. When the pressure sensor 613 is arranged on the lower layer of the touch display screen 605, the processor 601 controls a operability control element on the UI according to the user's pressure operation on the touch display screen 605. The operability control element includes at least one of a button control element, a scroll bar control element, an icon control element, and a menu control element.

The fingerprint sensor 614 is used to collect a user's fingerprint, and the processor 601 identifies the user's identity according to the fingerprint collected by the fingerprint sensor 614, or the fingerprint sensor 614 identifies the user's identity according to the collected fingerprint. When it is recognized that the user's identity is a trusted identity, the processor 601 authorizes the user to perform related sensitive operations, including unlocking a screen, viewing encrypted information, downloading software, paying, and changing settings. The fingerprint sensor 614 may be provided on the front, back or side of the electronic apparatus 600. When the electronic apparatus 600 is provided with a physical button or a manufacturer logo, the fingerprint sensor 614 may be integrated with the physical button or the manufacturer logo.

The optical sensor 615 is used to collect the ambient light intensity. In an embodiment, the processor 601 may control the display brightness of the touch screen 605 according to the intensity of the ambient light collected by the optical sensor 615. Specifically, when the ambient light intensity is high, the display brightness of the touch display screen 605 is increased, and when the ambient light intensity is low, the display brightness of the touch display screen 605 is decreased. In another embodiment, the processor 601 may also dynamically adjust the shooting parameters of the camera assembly 606 according to the ambient light intensity collected by the optical sensor 615.

The proximity sensor 616, also called a distance sensor, may be arranged on a front panel of the electronic apparatus 600. The proximity sensor 616 is used to collect a distance between the user and the front of the electronic apparatus 600. In one embodiment, when the proximity sensor 616 detects that the distance between the user and the front of the electronic apparatus 600 gradually decreases, the processor 601 controls the touch screen 605 to switch from on-screen state to off-screen state, and when the proximity sensor 616 detects that the distance between the user and the front of the electronic apparatus 600 gradually increases, the processor 601 controls the touch display screen 605 to switch from the off-screen state to the on-screen state.

Those skilled in the art may understand that the structure shown in FIG. 6 does not constitute a limitation on the electronic apparatus 600, and may include more or fewer components than shown, or combine certain components, or adopt different component arrangements.

According to an embodiment of the present disclosure, there may also be provided a computer-readable storage medium storing instructions, when executed by at least one processor, causing the at least one processor to execute the method for acquiring a floor map of a room layout according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to the embodiments of the present disclosure, a computer program product may also be provided, and instructions in the computer program product may be executed by a processor of a computer device to complete the method of acquiring a floor map of a room layout.

The method, device, electronic apparatus, and computer-readable storage medium for acquiring a floor map of a room layout according to the embodiments of the present disclosure can display the floor map of the room layout more accurately.

Those skilled in the art will understand that other embodiments may be derived from the embodiments of the disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The embodiments are to be regarded as examples, and the scope and spirit of the present disclosure are described in the following claims.

It should be understood that the present disclosure is not limited to the precise structure that has been described above and shown in the drawings, and various modifications and changes can be made without departing from its scope.

What is claimed is:

1. A method for acquiring a floor map of a room layout, the method comprising:
   acquiring a depth map and a two-dimensional (2D) image of an interior of a room;
   identifying a boundary line between a ceiling and a wall of the room in the acquired 2D image;
   determining valid pixels among pixels on the boundary line according to a first preset rule, wherein the valid pixels indicate a pixel that corresponds to an actual point in the identified line at the junction of the ceiling and the wall;

identifying an electronic device in the room and determining a location of the electronic device based on SLAM positioning technology;

determining three-dimensional (3D) coordinates of the actual points at the junction of the ceiling and the wall of the room corresponding to the valid pixels and 3D coordinates of the determined location of the electronic device based on the depth map and the 2D image;

converting the 3D coordinates of the actual points corresponding to the valid pixels and the 3D coordinates of the determined location of the electronic device coordinate into coordinates in a global coordinate system; and acquiring the floor map of the room layout by projecting the 3D coordinates of the actual points corresponding to the valid pixels on the boundary line converted into the global coordinate system and the 3D coordinates of the determined location of the electronic device converted into the global coordinate system onto a horizontal plane, wherein the floor map of the room layout comprises connection lines between projections of the 3D coordinates of the actual points corresponding to the valid pixels and an icon indicating a type and the location of the electronic device.

2. The method of claim 1, wherein the determining the valid pixels among the pixels on the boundary line according to the first preset rule comprises:

determining 3D coordinate of the actual point corresponding to each pixel on the boundary line and 3D coordinates of actual points corresponding to pixels near the boundary line based on the depth map, wherein the pixels near the boundary line are included in the 2D image and within a preset distance from the boundary line;

determining two adjacent points within a predetermined distance range from the actual point corresponding to the each pixel on the boundary line according to a second preset rule, and determining a direction of a plane formed by the actual point corresponding to the each pixel and the determined two adjacent points, wherein the two adjacent points are included in the actual points corresponding to the pixels near the boundary line;

sequentially determining a difference between directions of planes respectively corresponding to any two adjacent pixels on the boundary line;

based on the difference being less than or equal to a first threshold value, determining that the two adjacent pixels on the boundary line are valid pixels; and based on the difference being greater than the first threshold value, determining that the two adjacent pixels on the boundary line are invalid pixels, and wherein, when a previous pixel of a current pixel is determined to be an invalid pixel, a pixel closest to the current pixel among the valid pixels that are previously determined is determined to be a pixel adjacent to the current pixel.

3. The method of claim 1, wherein the identifying the electronic device in the room and determining the location of the electronic device comprises:

determining whether electronic devices that have been identified include an electronic device of the same type as a currently identified electronic device;

based on the electronic devices that have been identified including the electronic device of the same type as the currently identified electronic device, determining whether a distance between the currently identified electronic device and the electronic device of the same type is greater than or equal to a second threshold;

based on determining that the distance is greater than or equal to the second threshold, determining that the currently identified electronic device is a new electronic device; and based on determining that the distance is less than the second threshold, determining that the currently identified electronic device and the electronic device of the same type are the same electronic device.

4. The method of claim 3, wherein the identifying the electronic device in the room and determining the location of the electronic device further comprises:

based on determining that the currently identified electronic device and the electronic device of the same type are the same electronic device, determining newly determined coordinate of the currently identified electronic device to be coordinate of the electronic device of the same type.

5. The method of claim 1, further comprising:

identifying a furniture in the room and a location of the furniture; and acquiring the location of the furniture in the floor map of the room layout by projecting 3D coordinates of the location of the furniture onto the horizontal plane, wherein the floor map of the room layout comprises an icon representing a type and the location of the furniture.

6. The method of claim 1, further comprising:

displaying the floor map of the room layout on an electronic terminal; and establishing communication between the electronic terminal and the electronic device, wherein the icon corresponding to the electronic device is included in the floor map and is used to control the electronic device.

7. An electronic apparatus for acquiring a floor map of a room layout, comprising:

a memory storing instructions; and a processor configured to execute the instructions to:

acquire a depth map and a two-dimensional (2D) image of an interior of a room;

identify a boundary line between a ceiling and a wall of the room in the acquired 2D image;

determine valid pixels among pixels on the boundary line according to a first preset rule, wherein the valid pixels indicate a pixel that corresponds to the actual point in the identified line at the junction of the ceiling and the wall;

identify an electronic device in the room and determine a location of the electronic device based on SLAM positioning technology;

determine three-dimensional (3D) coordinates of the actual points at the junction of the ceiling and the wall of the room corresponding to the valid pixels and 3D coordinates of the determined location of the electronic device based on the depth map and the 2D image;

convert the 3D coordinates of the actual points corresponding to the valid pixels and the 3D coordinates of the determined location of the electronic device coordinate into coordinates in global coordinate system; and acquire the floor map of the room layout by projecting the 3D coordinates of the actual points corresponding to the valid pixels on the boundary line converted into the global coordinate system and the 3D coordinate of the determined location of the electronic device converted into the global coordinate system onto a horizontal plane, wherein the floor map of the room layout comprises connection lines between projections of the 3D coordinates of the actual points corresponding to the valid pixels and an icon indicating a type and the location of the electronic device.

8. The electronic apparatus of claim 7, wherein the processor is further configured to execute the instructions to:

determine 3D coordinate of actual point corresponding to each pixel on the boundary line and 3D coordinates of actual points corresponding to pixels near the boundary line based on the depth map, wherein the pixels near the boundary line are included in the 2D image and within a preset distance from the boundary line;

determine two adjacent points within a predetermined distance range from the actual point corresponding to the each pixel on the boundary line according to a second preset rule, and determine a direction of a plane formed by the actual point corresponding to the each pixel and the determined two adjacent points, wherein the two adjacent points are included in the actual points corresponding to the pixels near the boundary line;

sequentially determine a difference between directions of planes respectively corresponding to any two adjacent pixels on the boundary line;

based on the difference being less than or equal to a first threshold value, determine that the two adjacent pixels on the boundary line are valid pixels; and based on the difference being greater than the first threshold value, determine that the two adjacent pixels on the boundary line are invalid pixels, and wherein, when a previous pixel of a current pixel is determined to be an invalid pixel, a pixel closest to the current pixel among the valid pixels that are previously determined is determined to be a pixel adjacent to the current pixel.

9. The electronic apparatus of claim 7, wherein the processor is further configured to exe hate the instructions to:

determine whether electronic devices that have been identified include an electronic device of the same type as a currently identified electronic device;

based on the electronic devices that have been identified including the electronic device of the same type as the currently identified electronic device, determine whether a distance between the currently identified electronic device and the electronic device of the same type is greater than or equal to a second threshold;

based on determining that the distance is greater than or equal to the second threshold, determine that the currently identified electronic device is a new electronic device; and based on determining that the distance is less than the second threshold, determine that the currently identified electronic device and the electronic device of the same type are the same electronic device.

10. The electronic apparatus of claim 9, wherein the processor is further configured to execute the instructions to:

based on determining that the currently identified electronic device and the electronic device of the same type are the same electronic device, determine newly determined coordinate of the currently identified electronic device as coordinate of the electronic device of the same type.

11. The electronic apparatus of claim 9, wherein the processor is further configured to execute the instructions to:

identify a furniture in the room and a location of the furniture; and acquire the location of the furniture in the floor map of the room layout by projecting 3D coordinates of the location of the furniture onto the horizontal plane, wherein the floor map of the room layout comprises an icon representing a type and the location of the furniture.

12. The electronic apparatus of claim 7, further comprising:

a display configured to display the floor map of the room layout; and a communication interface configured to establish a communication between the electronic terminal and the electronic device, wherein the icon corresponding to the electronic device is included in the floor map and is used to control the electronic device.

13. A non-transitory computer-readable storage medium storing a computer program, when executed by a processor, causing the processor to implement a method including:

acquiring a depth map and a two-dimensional (2D) image of an interior of a room;

identifying a boundary line between a ceiling and a wall of the room in the acquired 2D image;

determining valid pixels among pixels on the boundary line according to a first preset rule, wherein the valid pixels indicate a pixel that corresponds to the actual point in the identified line at the junction of the ceiling and the wall;

identifying an electronic device in the room and determining a location of the electronic device based on SLAM positioning technology;

determining three-dimensional (3D) coordinates of the actual points at the junction of the ceiling and the wall of the room corresponding to the valid pixels and 3D coordinates of the determined location of the electronic device based on the depth map and the 2D image;

converting the 3D coordinates of the actual points corresponding to the valid pixels and the 3D coordinates of the determined location of the electronic device coordinate into coordinates in global coordinate system; and acquiring the floor map of the room layout by projecting the 3D coordinates of the actual points corresponding to the valid pixels on the boundary line converted into the global coordinate system and the 3D coordinates of the determined location of the electronic device converted into the global coordinate system onto a horizontal plane, and wherein, the floor map of the room layout comprises connection lines between projections of the 3D coordinates of the actual points corresponding to the valid pixels and an icon indicating a type and the location of the electronic device.

14. The method of claim 1, wherein the boundary line between the ceiling and the wall of the room is identified using a neural network model that is trained based on sample images including sample boundary lines.

15. The method of claim 1, wherein the acquiring the depth map and the 2D image of the interior of the room comprises:

acquiring only the depth map and the 2D image of a boundary area between the ceiling and the wall of the room, without acquiring a panoramic 2D image and depth map of the interior of the room.

16. The method of claim 1, wherein the determining of the valid pixels among the pixels on the boundary line according to the first preset rule comprises:

converting 2D coordinates of actual points in the 2D image to 3D coordinates corresponding to the 2D coordinates.

17. The electronic apparatus of claim 7, wherein the boundary line between the ceiling and the wall of the room is identified using a neural network model that is trained based on sample images including sample boundary lines.

18. The electronic apparatus of claim 7, wherein the processor is further configured to execute the instructions to:

acquire only the depth map and the 2D image of a boundary area between the ceiling and the wall of the room, without acquiring a panoramic 2D image and depth map of the interior of the room.

* * * * *